US012151468B2

(12) United States Patent
Ikeda

(10) Patent No.: US 12,151,468 B2
(45) Date of Patent: Nov. 26, 2024

(54) RECORDING MEDIUM PROCESSING APPARATUS AND IMAGE FORMATION SYSTEM

(71) Applicant: FUJIFILM Business Innovation Corp., Tokyo (JP)

(72) Inventor: Kentaro Ikeda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 441 days.

(21) Appl. No.: 17/306,973

(22) Filed: May 4, 2021

(65) Prior Publication Data

US 2022/0105737 A1 Apr. 7, 2022

(30) Foreign Application Priority Data

Oct. 1, 2020 (JP) ................................ 2020-167267

(51) Int. Cl.
*B41J 13/00* (2006.01)

(52) U.S. Cl.
CPC ................................ *B41J 13/0009* (2013.01)

(58) Field of Classification Search
CPC .. B41J 13/0009; B41J 11/0095; B41J 13/009; B41J 11/009; B41J 2203/01; B41J 2203/011; B41J 29/393
See application file for complete search history.

(56) References Cited

U.S. PATENT DOCUMENTS

2017/0082963 A1* 3/2017 Tsue .................. G03G 15/5062

FOREIGN PATENT DOCUMENTS

| | | |
|---|---|---|
| JP | 2005205747 | 8/2005 |
| JP | 2007043489 | 2/2007 |
| JP | 2015179122 | 10/2015 |
| JP | 2017177583 | 10/2017 |

OTHER PUBLICATIONS

"Notice of Reasons for Refusal of Japan Counterpart Application", issued on May 28, 2024, with English translation thereof, p. 1-p. 6.

* cited by examiner

*Primary Examiner* — Jannelle M Lebron
(74) *Attorney, Agent, or Firm* — JCIPRNET

(57) ABSTRACT

A recording medium processing apparatus includes an inspection result acquisition unit that acquires an inspection result, which is a result of inspection of each recording medium; and a transport unit that transports a recording medium whose inspection result acquired by the inspection result acquisition unit satisfies a predetermined condition to a first destination, transports a recording medium whose inspection result does not satisfy the predetermined condition to a second destination, and transports a predetermined specific recording medium to the first destination.

13 Claims, 11 Drawing Sheets

RECORDING MEDIUM PROCESSING APPARATUS AND IMAGE FORMATION SYSTEM

CROSS-REFERENCE TO RELATED APPLICATIONS

This application is based on and claims priority under 35 USC 119 from Japanese Patent Application No. 2020-167267 filed Oct. 1, 2020.

BACKGROUND

(i) Technical Field

The present disclosure relates to a recording medium processing apparatus and an image formation system.

(ii) Related Art

Japanese Unexamined Patent Application Publication No. 2017-177583 discloses a configuration in which a determining unit determines whether or not an image formed based on print data has a defect and, in a case where it is determined that the image formed based on the print data has no defect, a transport unit does not discard a sheet.

Japanese Unexamined Patent Application Publication No. 2015-179122 discloses processing in which a paper output control unit performs control so that a sheet determined as being defective is output to a paper output tray for waste paper and so that discontinuous pages are output to different trays.

SUMMARY

Some apparatuses that perform processing on a recording medium inspect each recording medium and perform processing such as removing a recording medium that does not satisfy a predetermined condition.

However, a specific recording medium may have no problem in terms of functions thereof even if an inspection result about the specific recording medium does not satisfy a predetermined condition. In such a case, removing the specific recording medium without exception invites troubles such as delay of production.

Aspects of non-limiting embodiments of the present disclosure relate to lessening troubles that can occur due to removal of a specific recording medium as compared with a case where the specific recording medium is removed without exception, for example, when the specific recording medium does not satisfy a predetermined condition.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a recording medium processing apparatus including an inspection result acquisition unit that acquires an inspection result, which is a result of inspection of each recording medium; and a transport unit that transports a recording medium whose inspection result acquired by the inspection result acquisition unit satisfies a predetermined condition to a first destination, transports a recording medium whose inspection result does not satisfy the predetermined condition to a second destination, and transports a predetermined specific recording medium to the first destination.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure is described in detail below with reference to the attached drawings.

Figure 1:
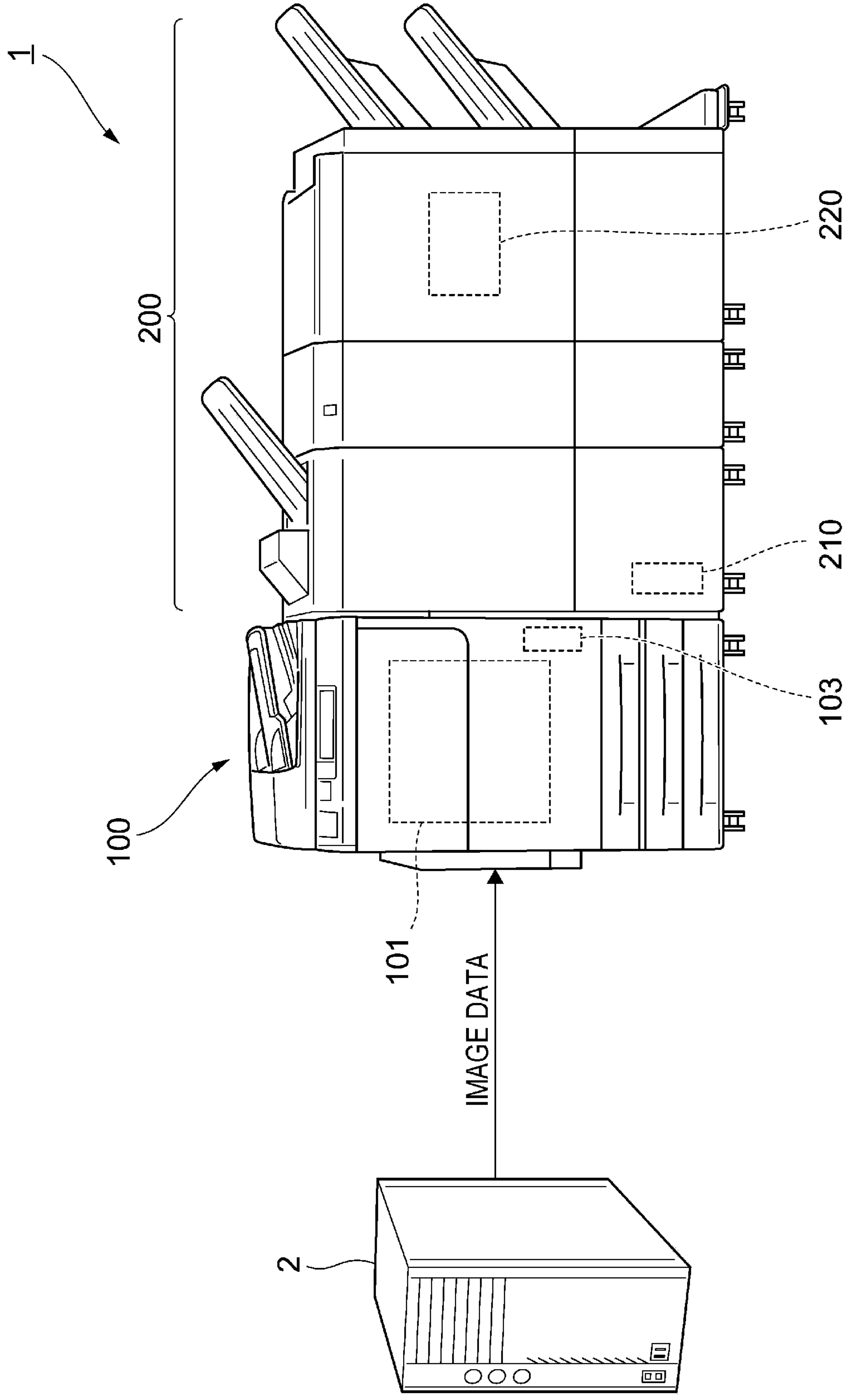
FIG. 1 illustrates an image formation system according to the present exemplary embodiment.

FIG. 1 illustrates an image formation system 1 according to the present exemplary embodiment.

The image formation system 1 includes an image forming apparatus 100 that forms an image on a sheet, which is an example of a recording medium. Furthermore, the image formation system 1 includes a sheet processing apparatus 200 that performs processing on a sheet on which an image has been formed by the image forming apparatus 100.

In the present exemplary embodiment, image data is supplied from a terminal apparatus 2, which is a computer, to the image formation system 1.

In the present exemplary embodiment, the image formation system 1 forms an image on a sheet on the basis of this image data and performs processing on the sheet on which the image has been formed.

The image forming apparatus 100 includes an image forming unit 101 and an image formation control unit 103.

The image forming unit 101 forms a toner image according to image data on a sheet, for example, by using an electrophotographic system. Note that the image forming unit 101 may form an image by using another system such as an inkjet head system.

The image formation control unit 103 controls each unit of the image forming apparatus 100.

Figure 2:
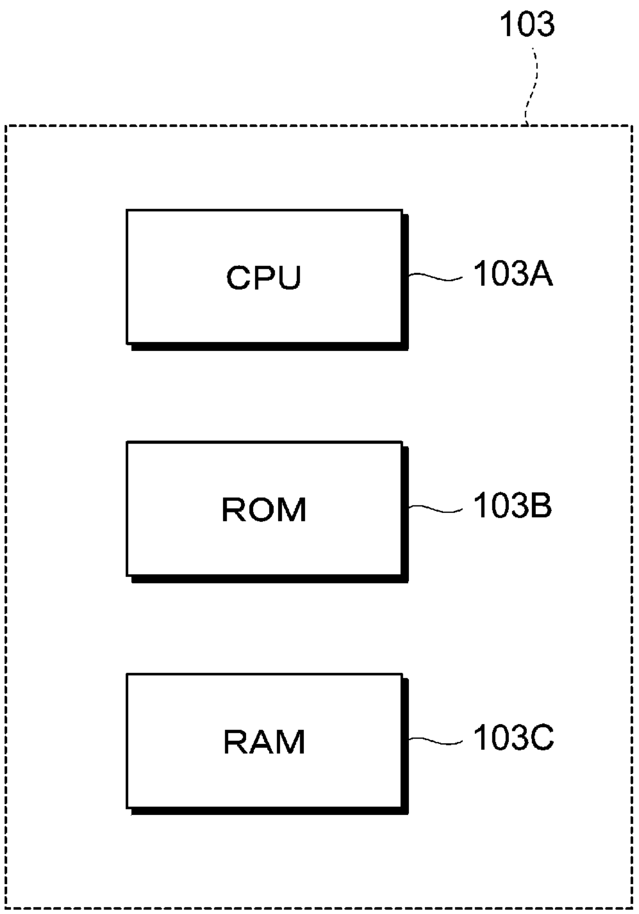
FIG. 2 illustrates a configuration of an image formation control unit.

FIG. 2 illustrates a configuration of the image formation control unit 103.

The image formation control unit 103 includes a central processing unit (CPU) 103A, a read only memory (ROM) 103B, and a random access memory (RAM) 103C.

The ROM 103B stores therein a program executed by the CPU 103A. The CPU 103A, which is an example of a processor, reads out the program stored in the ROM 103B and executes the program while using the RAM 103C as a work area.

The program executed by the CPU 103A may be offered to the image formation control unit 103 while being recorded in a computer-readable recording medium such as a magnetic recording medium (e.g., a magnetic tape, a magnetic disc), an optical recording medium (e.g., an optical disc), a magnetooptical recording medium, or a semiconductor memory.

Alternatively, the program executed by the CPU 103A may be downloaded to the image formation control unit 103 by using a means of communication such as the Internet.

Plural sheet processing units (not illustrated), a sheet processing control unit 210, and an inspection device 220 are provided in the sheet processing apparatus 200 (see FIG. 1), which is an example of a recording medium processing apparatus.

The sheet processing units perform processing such as sheet punching processing, sheet binding processing, and sheet folding processing. The sheet processing control unit 210 controls each unit of the sheet processing apparatus 200. The inspection device 220 inspects a sheet that has undergone the processing in the sheet processing units.

In the sheet processing apparatus 200, only inspection by the inspection device 220 may be performed without performing the processing such as sheet punching processing, sheet binding processing, and sheet folding processing.

In other words, in the sheet processing apparatus 200, only inspection of a sheet transported from the image forming apparatus 100 may be performed by using the inspection device 220.

Figure 3:
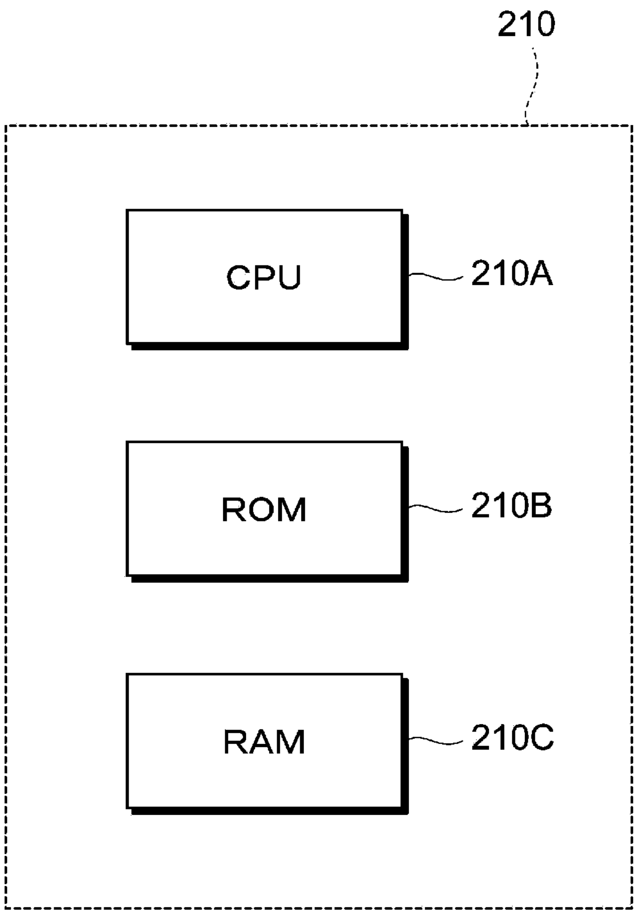
FIG. 3 illustrates an example of a configuration of hardware of a sheet processing control unit.

FIG. 3 illustrates an example of a configuration of hardware of the sheet processing control unit 210.

The sheet processing control unit 210 includes a central processing unit (CPU) 210A, a read only memory (ROM) 210B, and a random access memory (RAM) 210C.

The ROM 210B stores therein a program executed by the CPU 210A. The CPU 210A, which is an example of a processor, reads out a program stored in the ROM 210B and executes the program while using the RAM 210C as a work area. The sheet processing control unit 210 is a computer.

In the present exemplary embodiment, the CPU 210A executes a program stored, for example, in the ROM 210B, and thereby processing that will be described later is performed.

The program executed by the CPU 210A may be offered to the sheet processing control unit 210 while being recorded in a computer-readable recording medium such as a magnetic recording medium (e.g., a magnetic tape, a magnetic disc), an optical recording medium (e.g., an optical disc), a magnetooptical recording medium, or a semiconductor memory.

Alternatively, the program executed by the CPU 210A may be offered to the sheet processing control unit 210 by using a means of communication such as the Internet.

In the present exemplary embodiment, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

Furthermore, the term "processor" is broad enough to encompass one processor or plural processors in collaboration which are located physically apart from each other but may work cooperatively. The order of operations of the processor is not limited to one described in the present exemplary embodiment, and may be changed.

Figure 4:
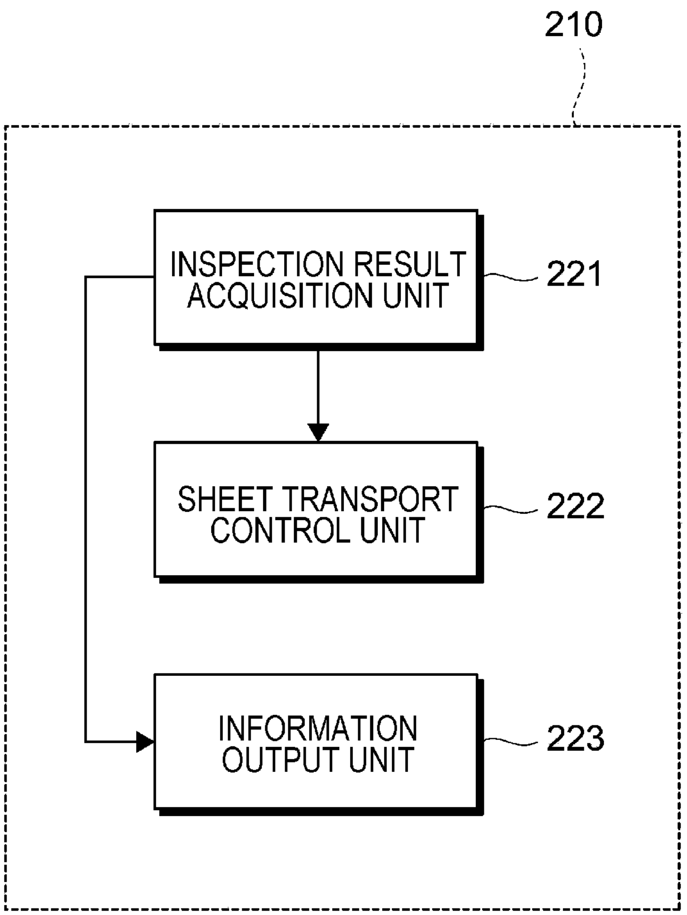
FIG. 4 illustrates functional units realized by a CPU of the sheet processing control unit.

FIG. 4 illustrates functional units realized by the CPU 210A of the sheet processing control unit 210. In FIG. 4, functional units concerning transport and inspection of a sheet are illustrated.

As illustrated in FIG. 4, the sheet processing control unit 210 functions as an inspection result acquisition unit 221, a sheet transport control unit 222, and an information output unit 223.

The inspection result acquisition unit 221, which is an example of an inspection result acquisition unit, acquires an inspection result, which is a result of inspection of a sheet performed by the inspection device 220 (see FIG. 1). In other words, the inspection result acquisition unit 221 acquires information output from the inspection device 220.

The sheet transport control unit 222 transports a sheet by controlling driving of a transport member (described later) provided in the sheet processing apparatus 200. As a result, in the present exemplary embodiment, a sheet transported from the image forming apparatus 100 is transported in the sheet processing apparatus 200.

In the present exemplary embodiment, a transport unit that transport a sheet, which is an example of a recording medium, is constituted by the sheet transport control unit 222 and the transport member provided in the sheet processing apparatus 200.

The information output unit 223 outputs predetermined information in a case where an inspection result about a specific sheet (described later) does not satisfy a second condition milder than a predetermined condition.

The CPU 210A of the sheet processing control unit 210 executes programs stored, for example, in the ROM 210B, and thereby the inspection result acquisition unit 221, the sheet transport control unit 222, and the information output unit 223 are realized.

In the present exemplary embodiment, processing described below is performed by the CPU 210A, which is an example of a processor. In other words, in the present exemplary embodiment, the CPU 210A, which is an example of a processor, performs programs stored, for example, in the ROM 210B, and thereby processing described below is performed.

In other words, in the present exemplary embodiment, the CPU 210A, which is an example of a processor, executes programs stored, for example, in the ROM 210B, and thereby the functional units, that is, the inspection result acquisition unit 221, the sheet transport control unit 222, and the information output unit 223 illustrated in FIG. 4 are realized. In the present exemplary embodiment, processing described below is performed by these functional units.

Figure 5:
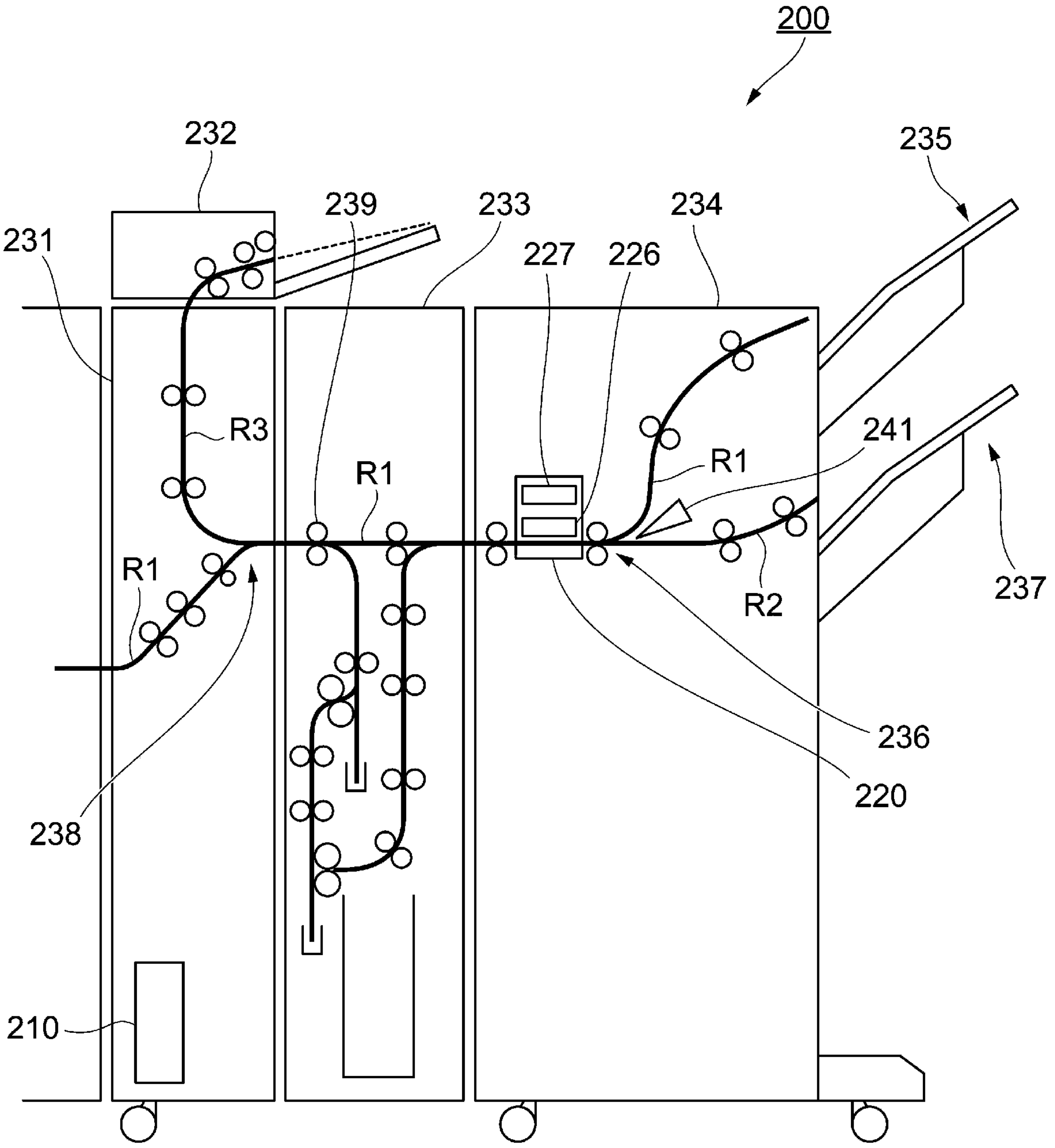
FIG. 5 is a view for explaining a sheet processing apparatus.

FIG. 5 is a view for explaining the sheet processing apparatus 200.

The sheet processing apparatus 200 according to the present exemplary embodiment includes a transport unit 231 that feeds a sheet transported from the image forming apparatus 100 to a downstream side. A paper feeding device 232 for feeding a sheet into the transport unit 231 is provided above the transport unit 231.

Furthermore, the sheet processing apparatus 200 includes a folding unit 233 that performs folding processing as needed on a sheet fed from the transport unit 231.

Furthermore, an inspection unit 234 that inspects a sheet is provided on a downstream side of the folding unit 233.

Furthermore, sheet processing units (not illustrated) that perform processing such as punching processing and binding processing are provided in the sheet processing apparatus 200.

Furthermore, a first sheet path R1 through which a sheet from the image forming apparatus 100 passes is provided in the sheet processing apparatus 200. The first sheet path R1 extends from the transport unit 231 to a first sheet stacking unit 235 provided in the inspection unit 234.

In the present exemplary embodiment, sheets transported through the first sheet path R1 are stacked on the first sheet stacking unit 235.

In the present exemplary embodiment, the inspection device 220 that inspects a sheet passing through the first sheet path R1 is provided in the inspection unit 234.

The inspection device 220 has an image reading unit 226 that reads an image on a sheet passing the inspection device 220 and a determining unit 227 and inspects the sheet passing the inspection device 220.

The image reading unit 226 is, for example, a scanner device including an imaging element such as a charge coupled device. The determining unit 227 is a computer device including a CPU as an example of a processor.

Furthermore, in the present exemplary embodiment, a second sheet path R2 that branches from the first sheet path R1 is provided on a downstream side of the inspection device 220 in a direction in which a sheet is transported through the first sheet path R1.

The second sheet path R2 branches from the first sheet path R1 at a branch part 236 and extends to a second sheet stacking unit 237. In the present exemplary embodiment, sheets transported through the second sheet path R2 are stacked on the second sheet stacking unit 237.

Furthermore, in the present exemplary embodiment, a merging path R3 that extends from the paper feeding device 232 to the first sheet path R1 and merges with the first sheet path R1 at a merging part 238 is provided.

In the present exemplary embodiment, the merging part 238 is located on an upstream side of the inspection device 220 in the direction in which a sheet is transported through the first sheet path R1. A sheet fed from the paper feeding device 232 is supplied to the first sheet path R1 through the merging path R3 and is then transported to the first sheet stacking unit 235 or the second sheet stacking unit 237.

Furthermore, in the present exemplary embodiment, transport rolls 239, which are an example of a transport member that transports a sheet on the first sheet path R1, the second sheet path R2, and the merging path R3 to a downstream side are provided on the first sheet path R1, the second sheet path R2, and the merging path R3.

Furthermore, a switching member 241 that switches a destination of a sheet that has reached the branch part 236 through the first sheet path R1 between the first sheet stacking unit 235 and the second sheet stacking unit 237 is provided at the branch part 236.

In the present exemplary embodiment, the switching member 241 is driven by the sheet transport control unit 222 (see FIG. 4), and thus a sheet that has reached the branch part 236 through the first sheet path R1 is transported to either the first sheet stacking unit 235 or the second sheet stacking unit 237.

Basic processing performed by the image formation system 1 according to the present exemplary embodiment is described below with reference to FIG. 6, which is a view for explaining processing performed by the image formation system 1.

In the present exemplary embodiment, first, an image is sequentially formed on a sheet in the image forming apparatus 100 indicated by reference sign 6A. Then, in the present exemplary embodiment, a sheet on which an image has been formed by the image forming apparatus 100 is sequentially supplied to the sheet processing apparatus 200 indicated by reference sign 6B.

The sheet supplied to the sheet processing apparatus 200 is transported to the inspection device 220 provided in the inspection unit 234 after undergoing processing in the sheet processing apparatus 200 or after just passing the sheet processing apparatus 200.

In the inspection device 220, for example, whether or not there is a blot is inspected. Whether or not there is a blot may be inspected by a known method.

Specifically, in the present exemplary embodiment, for example, the determining unit 227 (see FIG. 5) of the inspection device 220 compares a reference image registered in advance and a read image obtained by reading an actual sheet by the image reading unit 226 (see FIG. 5) of the inspection device 220. Whether or not there is a blot is determined on the basis of a result of the comparison.

In the present exemplary embodiment, an inspection result (a result of the determination of the determining unit 227), which is a result of inspection of a sheet, is supplied from the inspection device 220 to the inspection result acquisition unit 221 (see FIG. 4), which is an example of an inspection result acquisition unit, every time a sheet is inspected by the inspection device 220. Then, the inspection result acquisition unit 221 acquires this inspection result.

Then, the sheet transport control unit 222 (see FIG. 4) transports the target sheet (the sheet that has passed the inspection device 220) to a predetermined destination on the basis of the inspection result acquired by the inspection result acquisition unit 221.

Specifically, the sheet transport control unit 222 transports the target sheet to the first sheet stacking unit 235 (see reference sign 6X in FIG. 6), which is an example of a first destination, in a case where an inspection result of the target sheet acquired by the inspection result acquisition unit 221 satisfies a predetermined condition.

Meanwhile, the sheet transport control unit 222 transports the target sheet to the second sheet stacking unit 237 (see reference sign 6Y in FIG. 6), which is an example of a second destination, in a case where an inspection result of the target sheet does not satisfy the predetermined condition.

Figure 6:
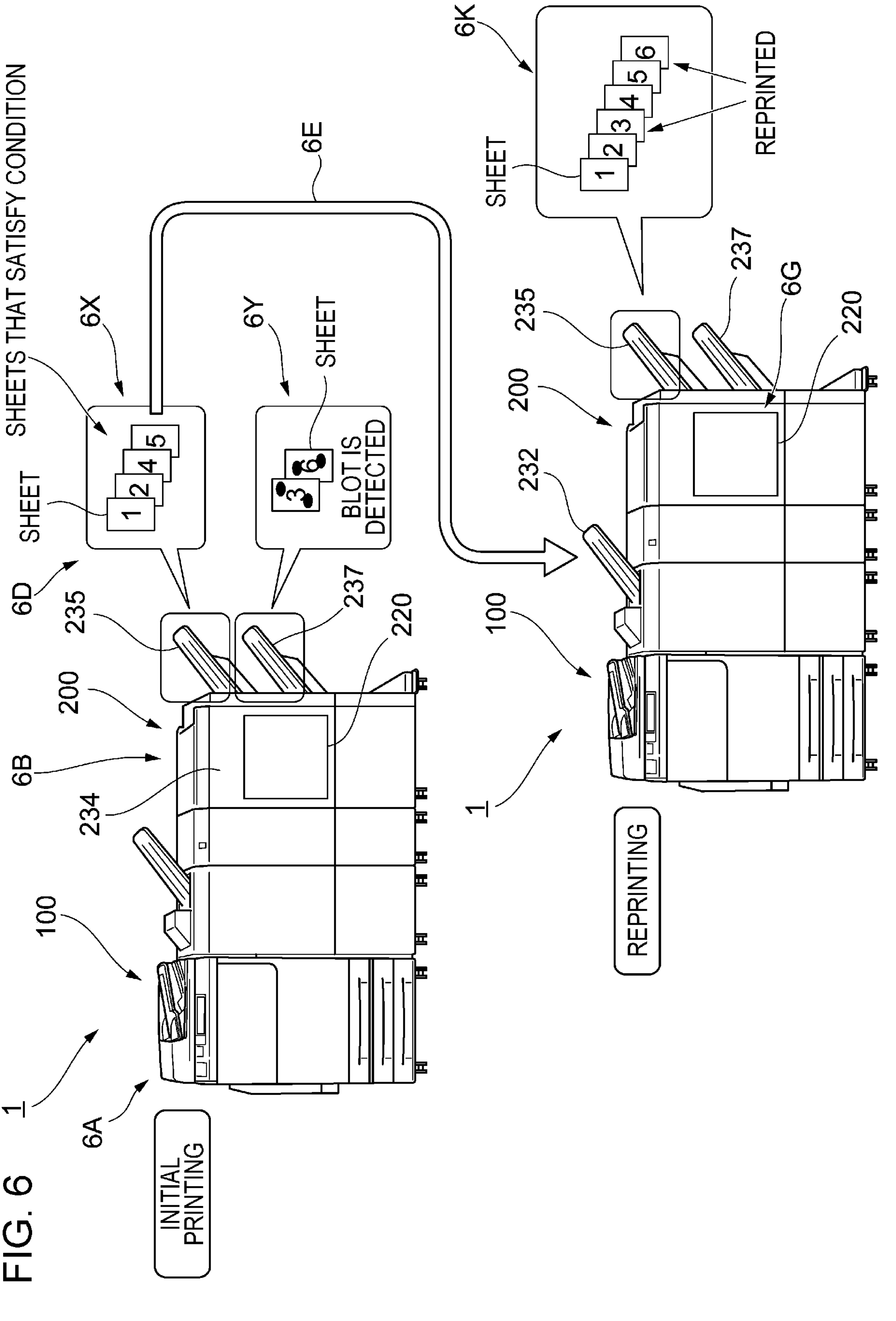
FIG. 6 is a view for explaining processing executed in the image formation system.

As a result, in the present exemplary embodiment, when processing related to one print job is finished, sheets are stacked on the first sheet stacking unit 235 and the second sheet stacking unit 237 as indicated by reference sign 6D of FIG. 6.

Then, in the present exemplary embodiment, in a case where a sheet is stacked on the second sheet stacking unit 237, the sheet stacked on the second sheet stacking unit 237 is discarded.

In this case, a sheet that satisfies the predetermined condition stacked on the first sheet stacking unit 235 is placed on the paper feeding device 232 by an operator, as indicated by reference sign 6E.

In the present exemplary embodiment, there is a blot on some sheets, and in a case where these sheets are stacked on the second sheet stacking unit 237 (see reference sign 6Y), these sheets are discarded.

Furthermore, sheets (see reference sign 6X) that satisfy the predetermined condition stacked on the first sheet stacking unit 235 are placed on the paper feeding device 232 by an operator, as indicated by reference sign 6E.

Specifically, in this example, there is a blot on the third and sixth sheets, and inspection results of the third and sixth sheets do not satisfy the predetermined condition, as indicated by reference sign 6Y. In this case, the third and sixth sheets are transported to the second sheet stacking unit 237. Then, in this case, the third and sixth sheets are discarded.

Meanwhile, the first, second, fourth, and fifth sheets (sheets indicated by reference sign 6X) that satisfy the predetermined condition stacked on the first sheet stacking unit 235 are placed on the paper feeding device 232 by an operator, as indicated by reference sign 6E.

Then, reprinting is performed.

In the reprinting, images formed on the some sheets (the third and sixth sheets) are formed on new sheets in the image forming apparatus 100, and the new sheets on which the images have been printed are fed to the first sheet path R1 (see FIG. 5).

Furthermore, the sheets (the first, second, fourth, and fifth sheets) that satisfy the predetermined condition are fed from the paper feeding device 232 to the first sheet path R1.

Then, these sheets fed again to the first sheet path R1 are transported to either the first sheet stacking unit 235 or the second sheet stacking unit 237 after passing the inspection device 220 (see reference sign 6G in FIG. 6).

In a case where no sheet is stacked on the second sheet stacking unit 237 and all of the sheets are stacked on the first sheet stacking unit 235 as indicated by reference sign 6K, the processing in the image formation system 1 is finished.

Then, in this processing example, the sheets stacked on the first sheet stacking unit 235 are fed to a later step. In the later step, a predetermined product is manufactured from these sheets.

A specific example of the product is a booklet. Specifically, one or more booklets are created from the sheets transported to the first sheet stacking unit 235, for example, by binding processing using a binding needle or the like or binding processing using no binding needle.

The "booklet" as used herein refers to plural sheets that have been bound up. The "binding processing" as used herein is not limited to binding processing using a binding needle and encompasses binding processing that joins sheets by pressure without using a binding needle and binding processing using a binder such as a clip.

The "product" produced from the sheets stacked on the first sheet stacking unit 235 is not limited to a booklet.

The "product" is not limited in particular as long as it is produced from a recording medium such as a sheet and encompasses ones (e.g., newspaper) produced through folding processing, ones (e.g., a notebook) which are bundles of sheets, craftwork produced from paper, postcards, business cards, and the like.

Furthermore, the "product" is not limited to ones for sale and encompasses ones that are distributed in a form other than sale in one organization.

In the sheet processing apparatus 200, a sheet that is removed before completion of a product and in not included in the product is sometimes transported.

In other words, in the present exemplary embodiment, a sheet that is not used in a final product and is not included in the final product is sometimes transported to the inspection device 220 and is then transported to the first sheet stacking unit 235 or the second sheet stacking unit 237.

The sheet that is not included in the final product is not supplied to a customer or the like of the final product and therefore does not need strict inspection and does not need the processing such as reprinting. In other words, basically, a sheet that is not included in a final product can be continuously used at it is even if there is a blot on the sheet.

However, according to the processing described above, in a case where there is a blot on a sheet that is not included in a final product, this sheet is transported to the second sheet stacking unit 237, and reprinting is performed.

This causes a large burden on an operator. Furthermore, the reprinting tends to cause delay of processing in the image formation system 1 and delay of processing in a subsequent step.

It is also possible to employ an arrangement in which in a case where a sheet that is not included in a final product is transported to the second sheet stacking unit 237, an operator selects a sheet that can be reused by visually checking each sheet transported to the second sheet stacking unit 237.

However, even in this case, the selecting work is troublesome, and a burden on the operator is large. Furthermore, even in this case, delay of the processing in the image formation system 1 and delay of processing in a subsequent step tend to occur.

In view of this, in the present exemplary embodiment, a sheet (hereinafter referred to as a "specific sheet"), such as a sheet that is not included in a product, that can be continuously used as it is even if there is a blot on the sheet is transported not to the second sheet stacking unit 237 but to the first sheet stacking unit 235.

In other words, in the present exemplary embodiment, the sheet processing control unit 210 causes a specific sheet to be transported to the first sheet stacking unit 235 even in a case where an inspection result about the specific sheet acquired by the inspection result acquisition unit 221 does not satisfy the predetermined condition.

The specific sheet is removed in the end. Therefore, even in a case where the specific sheet whose inspection result does not satisfy the predetermined condition is transported to the first sheet stacking unit 235 as in the present exemplary embodiment, this specific sheet is not included in a final product and therefore no problem occurs.

Meanwhile, in the present exemplary embodiment, the sheet transport control unit 222 transports a sheet that is not the specific sheet and is included in a product to the second sheet stacking unit 237, which is a second destination, in a case where the sheet does not satisfy the predetermined condition.

Examples of the specific sheet are as follows:

(1) a sheet on which information related to printing such as a print job name or a print condition is printed, (2) a sheet for refreshing (a sheet for ink ejection) or a sheet used for nozzle check in a case where an inkjet printing system is used as the image forming unit 101, and (3) a sheet used for partition disposed between print jobs.

Figure 7:
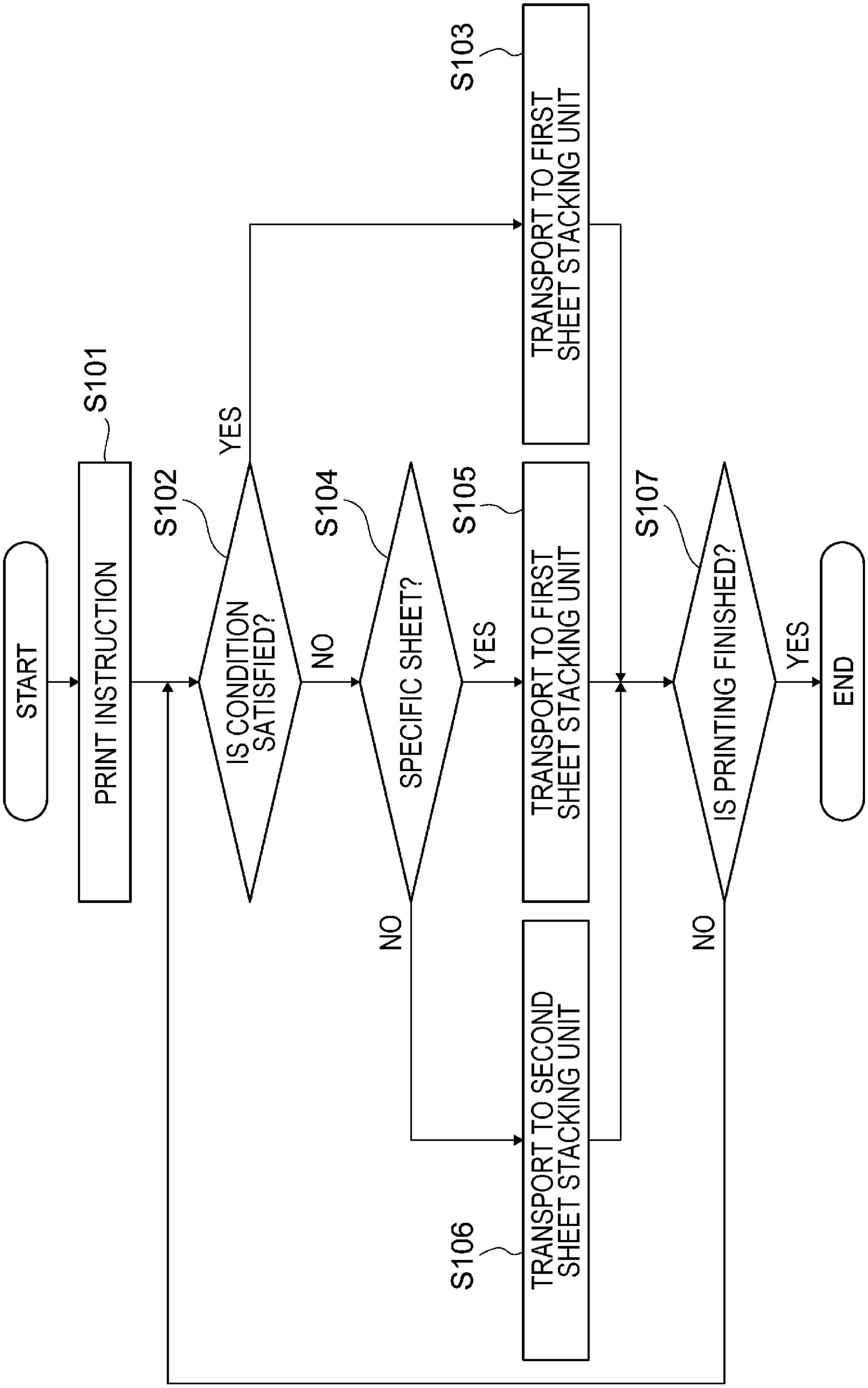
FIG. 7 is a flowchart illustrating a flow of processing performed in the image formation system according to the present exemplary embodiment.

FIG. 7 is a flowchart illustrating a flow of processing performed in the image formation system 1 according to the present exemplary embodiment.

In the present exemplary embodiment, first, an operator gives a print instruction by using the terminal apparatus 2 (not illustrated, see FIG. 1) (step S101). In response to this, image data is supplied from the terminal apparatus 2 to the image formation system 1.

In the image formation system 1, the image forming apparatus 100 sequentially performs print processing on sheets based on the image data, and the sheets are transported to the sheet processing apparatus 200 and are then inspected in the sheet processing apparatus 200.

Specifically, in the present exemplary embodiment, inspection is performed by the inspection device 220 every time a sheet passes the inspection device 220 to determine whether or not the sheet satisfies a predetermined condition (step S102).

Then, a sheet whose inspection result obtained by the inspection device 220 satisfies the predetermined condition is transported to the first sheet stacking unit 235 (step S103).

Meanwhile, it is determined whether or not a sheet whose inspection result obtained by the inspection device 220 does not satisfy the predetermined condition is a specific sheet (step S104).

In a case where it is determined in step S104 that the sheet is a specific sheet, this sheet determined as being a specific sheet is transported to the first sheet stacking unit 235 (step S105).

Meanwhile, in a case where it is determined in step S104 that the sheet is not a specific sheet, the sheet is transported to the second sheet stacking unit 237 (step S106).

Then, it is determined whether or not all pages included in a print job have been printed (step S107). In a case where it is determined that all pages have been printed, the processing is finished. Meanwhile, in a case where it is determined in step S107 that not all pages have been printed, the processes in step S102 and subsequent steps are performed again.

Figures 8A, 8B:
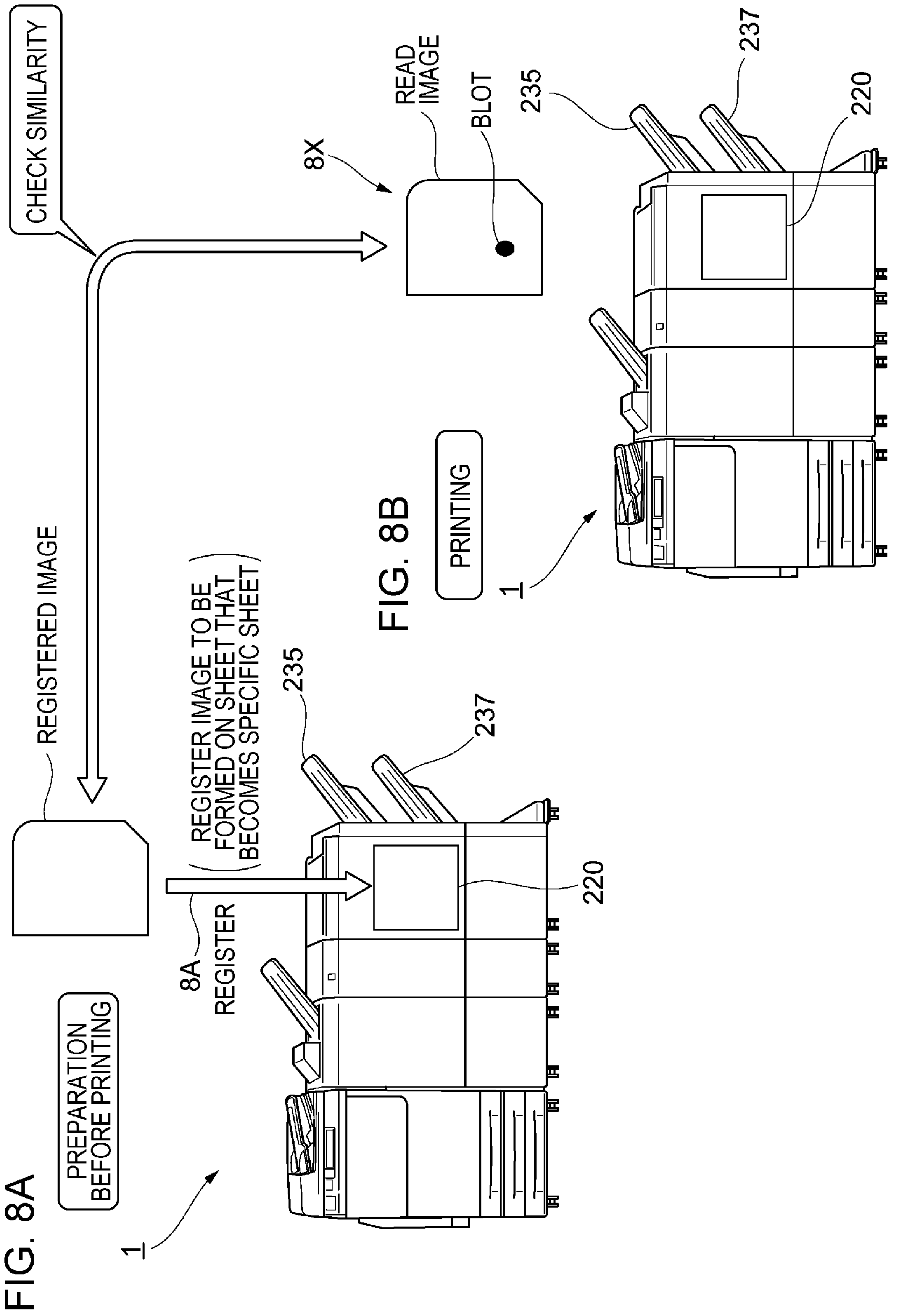
FIGS. 8A and 8B illustrate a specific example of processing in a case where processing is performed on a specific sheet.

FIGS. 8A and 8B illustrate a specific example of processing in a case where processing is performed on a specific sheet.

The sheet transport control unit 222 (see FIG. 4) according to the present exemplary embodiment grasps a specific sheet on the basis of information obtained from each sheet sequentially transported in the sheet processing apparatus 200. Then, the sheet transport control unit 222 transports the specific sheet thus grasped to the first sheet stacking unit 235, which is an example of a first destination.

More specifically, the sheet transport control unit 222 grasps a specific sheet on the basis of a read image obtained by reading an image formed on each sheet sequentially transported in the sheet processing apparatus 200 and transports the specific sheet thus grasped to the first sheet stacking unit 235.

More specifically, the sheet transport control unit 222 specifies a sheet having an image whose similarity with a registered image registered in advance exceeds a predetermined threshold value on the basis of a read image obtained by reading an image formed on each sheet.

The sheet transport control unit 222 grasps the specified sheet as a specific sheet and transports the specific sheet thus grasped to the first sheet stacking unit 235.

In this processing example, an image to be formed on a specific sheet is registered in advance in a memory (not illustrated) provided in the inspection device 220 (see FIG. 8A)), as indicated by reference sign 8A in FIG. 8A.

In other words, in this processing example, an image to be formed on a specific sheet is registered in advance in the inspection device 220 as a preparation before printing. Hereinafter, this image is referred to as a “registered image”.

In this processing example, a sheet sequentially passes the inspection device 220 at a time of printing illustrated in FIG. 8B, and an image formed on a sheet that sequentially passes the inspection device 220 is read by using the image reading unit 226 (see FIG. 5) provided in the inspection device 220.

In this way, a read image is generated for each sheet. Then, the inspection device 220 grasps a similarity between the read image and the registered image every time the read image is newly generated.

In a case where there is a sheet whose similarity between the read image and the registered image exceeds a predetermined threshold value, the inspection device 220 outputs information on this sheet, and the inspection result acquisition unit 221 (see FIG. 4) acquires the information on this sheet.

Next, the sheet transport control unit 222 grasps, as a specific sheet, the sheet specified by the information on this sheet on the basis of the information on this sheet output from the inspection result acquisition unit 221 and transports the specific sheet to the first sheet stacking unit 235.

The sheet transport control unit 222 transports this sheet grasped as a specific sheet to the first sheet stacking unit 235 even in a case where there is a blot on this sheet, as indicated by reference sign 8X in FIG. 8.

In other words, the sheet processing control unit 210 transports this sheet grasped as a specific sheet to the first sheet stacking unit 235 even in a case where the inspection device 220 determines that this sheet does not satisfy the predetermined condition.

Note that the sheet processing control unit 210 also transports a specific sheet determined as satisfying the predetermined condition by the inspection device 220 to the first sheet stacking unit 235.

Figure 9:
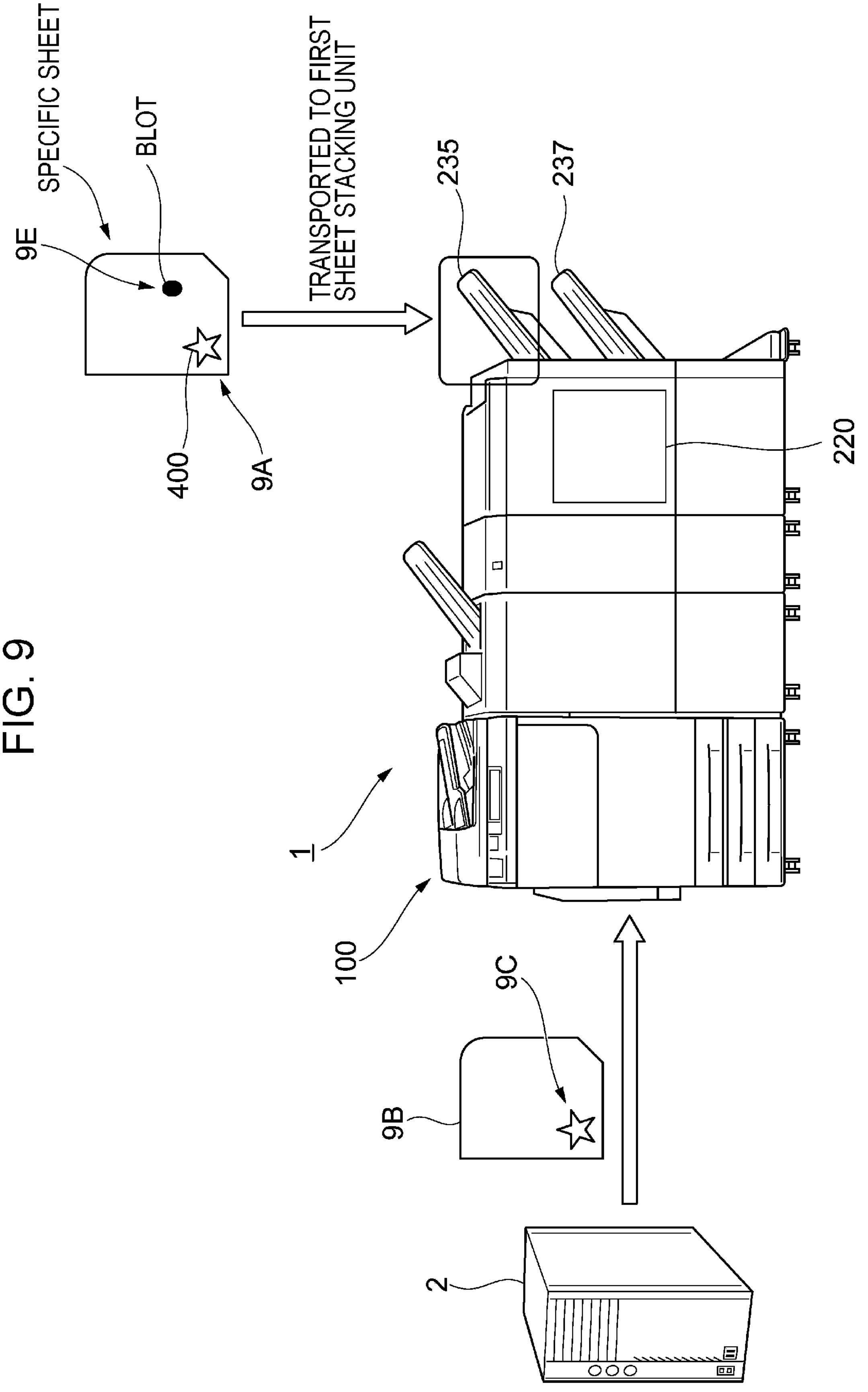
FIG. 9 is a view for explaining another processing example.

FIG. 9 is a view for explaining another processing example.

In this processing example, the sheet transport control unit 222 specifies a sheet having a predetermined specific image formed on a part thereof on the basis of the read image obtained by the inspection device 220.

Then, the sheet transport control unit 222 grasps this specified image as a specific sheet and transports this specific sheet to the first sheet stacking unit 235.

In this processing example, a predetermined specific image 400 is formed on a part of a sheet that is a specific sheet, as indicated by reference sign 9A.

Although the specific image 400 is a star-shaped image in this processing example, the specific image 400 may be an image other than a star shape. Specifically, the specific image 400 may be an image having a shape such as a rectangular shape, an oval shape, or a circular shape. The specific image 400 may be text information.

The sheet transport control unit 222 transports a sheet having the predetermined specific image 400 formed on a part thereof to the first sheet stacking unit 235. In other words, the sheet transport control unit 222 grasps a sheet on which the predetermined specific image 400 is formed as a specific sheet and transports this specific sheet to the first sheet stacking unit 235.

More specifically, the sheet transport control unit 222 transports a sheet on which the predetermined specific image 400 is formed to the first sheet stacking unit 235 even in a case where there is a blot on the sheet and the sheet does not satisfy the predetermined condition.

In this processing example, image data 9C for forming the specific image 400 is added in advance to original image data 9B based on which an image is to be formed on a sheet that is a specific sheet.

More specifically, in this processing example, the image data 9C for forming the specific image 400 is added in advance to the original image data 9B in the terminal apparatus 2.

As a result, in the present exemplary embodiment, in a case where an image is formed on a sheet that is a specific sheet is formed in the image forming apparatus 100, the specific image 400 is included in a part of this image.

Furthermore, in this processing example, this specific image 400 is registered in advance in the inspection device 220.

In this processing example, when a read image is obtained for each sheet by the inspection device 220, the inspection device 220 determines whether or not the read image includes the registered specific image 400.

In a case where the inspection device 220 determines that the read image includes the specific image 400, information indicating that the specific image 400 is included is output, and the inspection result acquisition unit 221 (see FIG. 4) acquires this information indicating that the specific image 400 is included.

In a case where the inspection result acquisition unit 221 acquires this information indicating that the specific image 400 is included, the sheet transport control unit 222 grasps a sheet whose read image includes the specific image 400 as a specific sheet. Then, the sheet transport control unit 222 transports the specific sheet thus grasped to the first sheet stacking unit 235.

More specifically, as in the above case, the sheet transport control unit 222 transports the specific sheet to the first sheet stacking unit 235 even in a case where the inspection device 220 determines that there is a blot on the specific sheet and the specific sheet does not satisfy the predetermined condition, as indicated by reference sign 9E.

Figure 10:
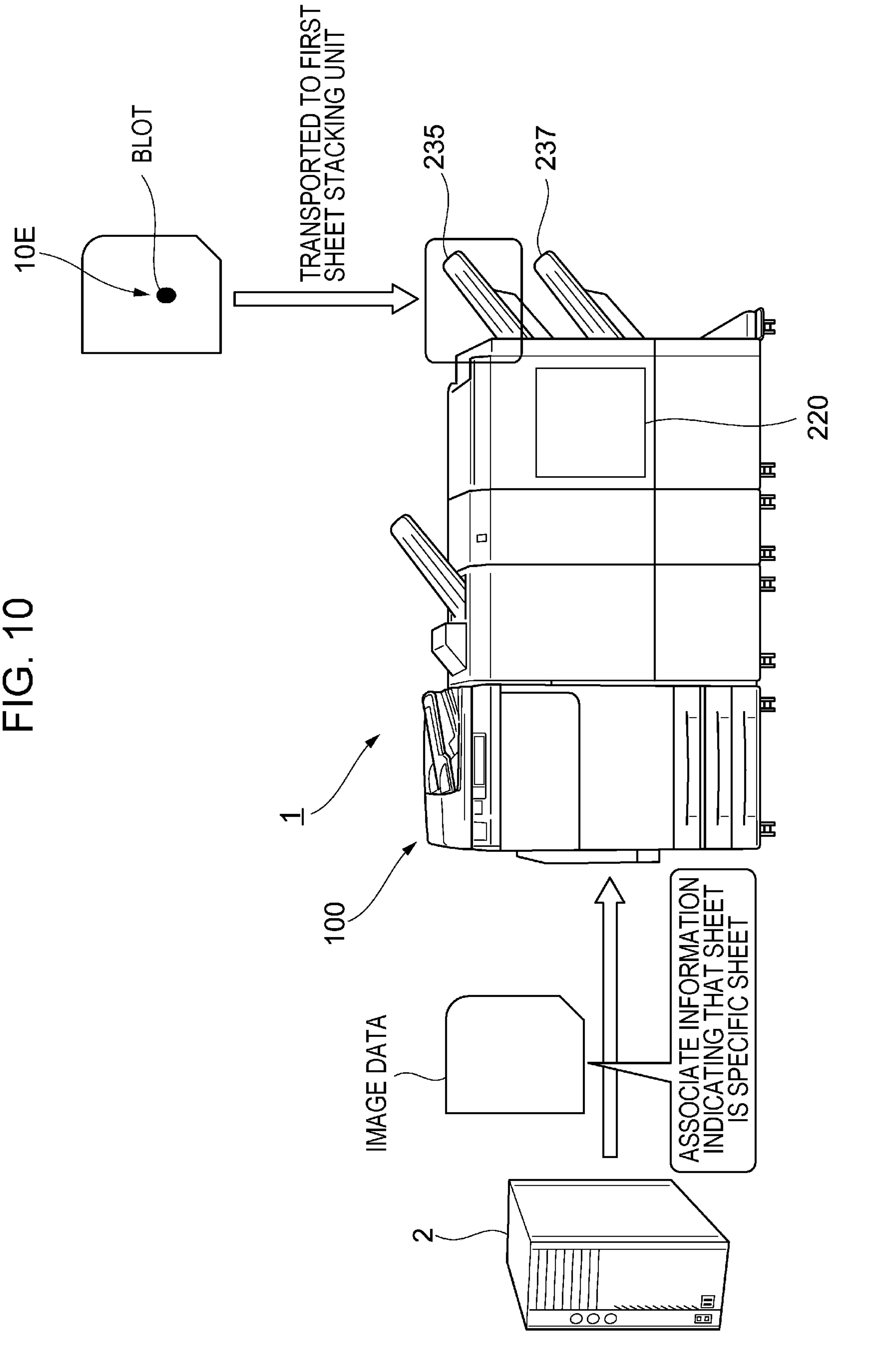
FIG. 10 illustrates another processing example.

FIG. 10 illustrates another processing example.

In this processing example, the sheet transport control unit 222 grasps a specific sheet on the basis of information associated with image data based on which an image is formed on a sheet and transports the specific sheet thus grasped to the first sheet stacking unit 235.

More specifically, in this processing example, information indicating that a sheet is a specific sheet is associated in advance with image data based on which an image is to be formed on the sheet that is a specific sheet among pieces of image data supplied to the image formation system 1. Note that this association is performed, for example, in the terminal apparatus 2.

More specifically, in this processing example, attribute information indicating that a sheet is a specific sheet is added to image data based on which an image is formed on the sheet that is a specific sheet among pieces of image data.

In this processing example, the sheet transport control unit 222 grasps, as a specific sheet, a sheet on which an image has been formed based on image data to which the attribute information indicating that the sheet is a specific sheet has been added when sequentially transporting sheets in the sheet processing apparatus 200.

Then, the sheet transport control unit 222 transports the specific sheet thus grasped to the first sheet stacking unit 235.

More specifically, the sheet transport control unit 222 transports, to the first sheet stacking unit 235, a sheet on which an image has been formed based on image data to which the attribute information indicating that the sheet is a specific sheet has been added even in a case where there is a blot on the sheet, as indicated by reference sign 10E.

In other words, the sheet transport control unit 222 transports, to the first sheet stacking unit 235, a sheet on which an image has been formed based on image data to which the attribute information indicating that the sheet is a specific sheet has been added even in a case where the sheet does not satisfy the predetermined condition.

Figure 11:
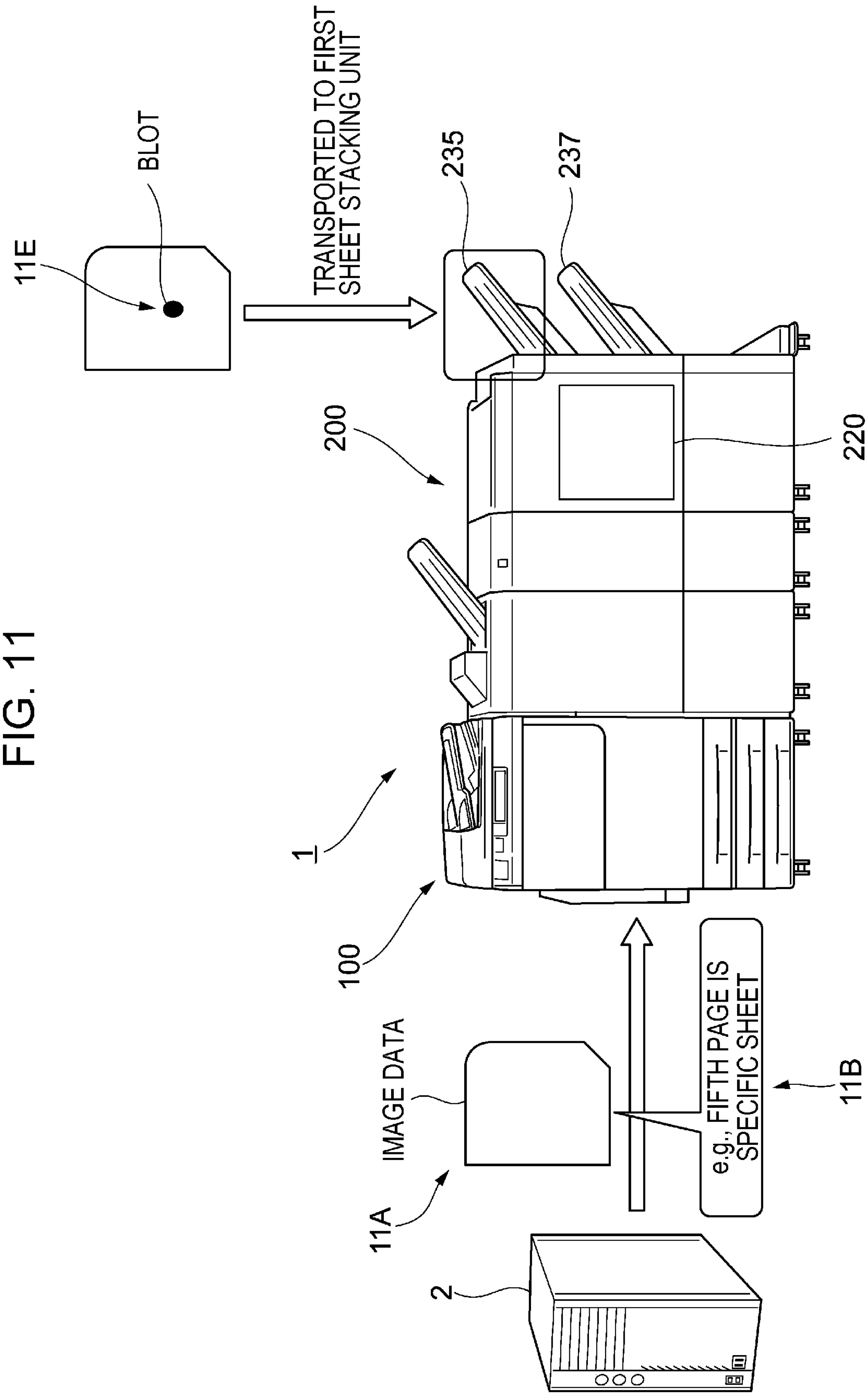
FIG. 11 illustrates another processing example.

FIG. 11 illustrates another processing example.

In this processing example, information on what number a specific sheet is in an order of transport in the sheet processing apparatus 200 is included in advance in the "information associated with image data".

In other words, in this processing example, information on what number a specific sheet is in an order of transport in the sheet processing apparatus 200 is included in attribute information added to image data.

In other words, in this processing example, information on what number a specific sheet is in an order of transport in the sheet processing apparatus 200 is associated with image data supplied to the image formation system 1.

In this processing example, the sheet transport control unit 222 grasps a specific sheet on the basis of this information and transports the specific sheet thus grasped to the first sheet stacking unit 235.

In the present exemplary embodiment, the sheet transport control unit 222 sequentially transports sheets that have been inspected by the inspection device 220 to either the first sheet stacking unit 235 or the second sheet stacking unit 237.

The sheet transport control unit 222 grasps a sheet whose number in the order of transport is the number specified by the aforementioned information as a specific sheet and transports the specific sheet to the first sheet stacking unit 235.

More specifically, in this processing example, the sheet transport control unit 222 transports a sheet whose number in the order of transport is the number specified by the aforementioned information to the first sheet stacking unit 235 even in a case where there is a blot on the sheet and the sheet does not satisfy the predetermined condition, as indicated by reference sign 11E.

In the present exemplary embodiment, image data based on which an image is to be formed on a sheet is supplied from the terminal apparatus 2 to the image formation system 1, as indicated by reference sign 11A. This starts printing processing in the image forming apparatus 100 and processing in the sheet processing apparatus 200.

In the present exemplary embodiment, information on what number a specific sheet is in an order of transport is associated in advance with the image data supplied to the image formation system 1.

The "information on what number a specific sheet is in an order of transport" may be information on the number itself or may be, for example, information indicating which page is a specific sheet, as indicated by reference sign 11B.

In other words, the "information on what number a specific sheet is in an order of transport" may be a page number of a sheet that is a specific sheet.

Other Remarks

In the present exemplary embodiment, a second condition milder than the predetermined condition is set.

The inspection device 220 also determines whether or not a specific sheet satisfies the second condition, and the inspection result acquisition unit 221 also acquires a result of this determination.

In the present exemplary embodiment, in a case where the result of the determination acquired by the inspection result acquisition unit 221 indicates that the second condition is not satisfied, the information output unit 223 outputs predetermined information such as information indicating that a trouble is occurring in the sheet processing apparatus 200.

In a case where an inspection result about a specific sheet does not satisfy the second condition milder than the predetermined condition, it is possible that not only a trouble of occurrence of a blot on the sheet but also a trouble of markedly disturbing an image formed on the sheet is occurring in the apparatus.

Accordingly, in the present exemplary embodiment, in a case where a result of inspection about a specific sheet indicates that the second condition is not satisfied, the information output unit 223 outputs predetermined information such as information indicating that a trouble is occurring in the sheet processing apparatus 200, as described above.

In the present exemplary embodiment, in this case, an error notification or the like is given to a user, for example, on a display device (not illustrated) provided in the image formation system 1 or a display device (not illustrated) provided in the terminal apparatus 2.

A state where the "predetermined condition" is satisfied is, for example, a state where a similarity between a reference image and a read image obtained by reading an actual sheet by the image reading unit 226 of the inspection device 220 is higher than a predetermined first threshold value.

A state where the "predetermined condition" is not satisfied is a state where the similarity is lower than the first threshold value.

A state where the "second condition milder than the predetermined condition" is not satisfied is, for example, a state where a similarity between the reference image and a read image obtained by reading an actual sheet by the image reading unit 226 is lower than a second threshold value lower than the first threshold value.

A state where the "second condition easier than the predetermined condition" is satisfied is a state where the similarity is higher than the second threshold value.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A recording medium processing apparatus comprising:

one or more processors configured to:

acquire an inspection result, which is a result of inspection of each recording medium;

transport a recording medium whose inspection result satisfies a predetermined condition to a first destination;

transport a recording medium whose inspection result does not satisfy the predetermined condition to a second destination; and transport a recording medium which is not included in a final product to the first destination even in a case where its inspection result does not satisfy the predetermined condition.

2. The recording medium processing apparatus according to claim 1, wherein the one or more processors is further configured to:

output predetermined information in a case where the inspection result about the recording medium acquired by the inspection result acquisition unit does not satisfy a second condition milder than the predetermined condition.

3. The recording medium processing apparatus according to claim 1, wherein a predetermined product is produced from a recording medium transported to the first destination; and wherein the one or more processors is further configured to transport a recording medium that is removed before completion of the product and is not included in the product to the first destination.

4. The recording medium processing apparatus according to claim 3, wherein the product is a booklet; and wherein the one or more processors is further configured to transport a recording medium that is removed before completion of the booklet and is not included in the booklet to the first destination.

5. The recording medium processing apparatus according to claim 3, wherein the one or more processors is further configured to transport a recording medium that is included in the product to the second destination in a case where the recording medium that is included in the product does not satisfy the predetermined condition.

6. The recording medium processing apparatus according to claim 1, wherein the one or more processors is further configured to grasp the specific recording medium on a basis of information obtained from each recording medium and transports the specific recording medium thus grasped to the first destination.

7. The recording medium processing apparatus according to claim 6, wherein the one or more processors is further configured to grasp the specific recording medium on a basis of a read image obtained by reading an image formed on each recording medium and transports the specific recording medium thus grasped to the first destination.

8. The recording medium processing apparatus according to claim 7, wherein the one or more processors is further configured to grasp a recording medium on which an image whose similarity with a registered image registered in advance exceeds a predetermined threshold value on a basis of the read image and transports the recording medium thus grasped to the first destination.

9. The recording medium processing apparatus according to claim 7, wherein the one or more processors is further configured to grasp a recording medium that has a predetermined specific image formed on a part thereof on a basis of the read image and transports the recording medium thus grasped to the first destination.

10. The recording medium processing apparatus according to claim 1, wherein the one or more processors is further configured to grasp the specific recording medium on a basis of information associated with image data based on which an image is formed on the recording medium and transports the specific recording medium thus grasped to the first destination.

11. The recording medium processing apparatus according to claim 1, wherein the one or more processors is further configured to grasp the specific recording medium on a basis of information on what number the specific recording medium is in an order of transport in the recording medium processing apparatus and transports the specific recording medium thus grasped to the first destination.

12. An image formation system comprising:

an image forming apparatus that forms an image on a recording medium; and a recording medium processing apparatus that performs processing on a recording medium on which an image has been formed by the image forming apparatus, wherein the recording medium processing apparatus includes the recording medium processing apparatus according to claim 1.

13. A recording medium processing apparatus comprising:

means for acquiring an inspection result, which is a result of inspection of each recording medium;

means for transporting a recording medium whose inspection result satisfies a predetermined condition to a first destination;

means for transporting a recording medium whose inspection result does not satisfy the predetermined condition to a second destination; and means for transporting a recording medium which is not included in a final product to the first destination even in a case where its inspection result does not satisfy the predetermined condition.

* * * * *